US005122755A

United States Patent [19]

Nootbaar et al.

[11] Patent Number: 5,122,755

[45] Date of Patent: Jun. 16, 1992

[54] CAPACITIVE POSITION DETECTOR

[75] Inventors: Michael W. Nootbaar, Benicia; Gerald R. Newell, Alamo, both of Calif.

[73] Assignee: New SD, Inc., San Francisco, Calif.

[21] Appl. No.: 697,926

[22] Filed: May 2, 1991

Related U.S. Application Data

[63] Continuation of Ser. No. 522,251, May 11, 1990, abandoned.

[51] Int. Cl.[5] .......... G01R 27/26

[52] U.S. Cl. .......... 324/678; 324/605; 324/681; 340/870.37

[58] Field of Search .......... 324/602, 605, 660, 661, 324/678, 681; 340/870.37

[56] References Cited

U.S. PATENT DOCUMENTS 4,122,708 10/1978 Maier .......... 324/662 X
4,165,483 8/1979 Holdren et al. .......... 324/661
4,206,400 6/1980 Holdren et al. .......... 324/679
4,483,194 11/1984 Rudolf .......... 73/517 R
4,743,838 5/1988 Eckerle .......... 324/660

FOREIGN PATENT DOCUMENTS 35284161 8/1985 Fed. Rep. of Germany .
3542030 11/1985 Fed. Rep. of Germany .
3732756 9/1987 Fed. Rep. of Germany .

*Primary Examiner*—Jack B. Harvey
*Attorney, Agent, or Firm*—Flehr, Hohbach, Test, Albritton & Herbert

[57] ABSTRACT

A differential capacitive pickoff detector circuit for measuring the difference in spacing of a pair of differential pickoff capacitor plates. Current sources are provided for each output terminal of each of the pair of differential capacitors so that for each capacitor output terminal a current signal alternates between a first current level and a second current level at a predetermined carrier clock switching rate. The capacitors are varied to provide DSB-LC voltage signals across each of the capacitors. The average value of each of the alternating voltages and their amplitudes are automatically adjusted to predetermined levels. The two DSB-LC voltage signals are combined to provide a DSB-SC signal. The DSB-SC signal is synchronously demodulated using a quadrature reference carrier clock signal to provide an output baseband signal which represents the difference between the spacing of the first and second differential capacitor plates.

38 Claims, 4 Drawing Sheets

90° CLOCK $i_{IN}$ $V_1$ $V_2$ $V_{OUT} = \frac{V_2 - V_1}{2}$

CAPACITIVE POSITION DETECTOR

This is a continuation of application Ser. No. 07/522,251 filed May 11, 1990, now abandoned.

BACKGROUND OF THE INVENTION

1. Field of the Invention

This invention relates to capacitor pickoff circuits.

2. Prior Art

A capacitive pick-off position detector is a position sensor which encodes displacement as a function of the capacitance value of a variable capacitor. Differential capacitance pickoffs encode displacement as a function of the difference between the capacitance values of two variable capacitors, which are typically ganged together so that as one capacitor increases in value, the second decreases in value. Typically, each of the differential capacitors is positioned on opposite sides of a moving mass or pendulum. It is desired that an electrical signal be provided which is a linear function of the pendulum displacement.

Prior art capacitive pick-off circuits use amplitude-modulation to encode variations in capacitance for a pair of differential capacitors. Each of the capacitors of a pair is used to amplitude modulate a respective reference carrier. The instantaneous amplitude of each of the modulated signals is proportional to the instantaneous value of each capacitor. The amplitude of each of the modulated signals is detected using, for example, a diode detector. The detected signals are then subtracted to provide an output signal which is proportional to the displacement of the pendulum. Signal processing with this prior art approach involves taking differences between two relatively large signals to produce a difference signal, which is very small. Subsequently, the small difference signal is greatly amplified. This approach introduces DC errors before appreciable signal gain is obtained. For a closed-loop, servoed-type of measuring system, DC errors can introduce unacceptable mechanical offset errors. For example, large DC errors can cause the servo to shift the equilibrium pendulum position away from its ideal mid-point position.

A prior art demodulator for a DSB-SC signal includes an adder circuit which adds the original DSB-SC signal to be demodulated with a second signal. The second signal is formed by first inverting and doubling the original signal and then chopping the resultant signal with a square wave at the frequency of the DSB-SC carrier reference signal. The resultant chopped signal is then added to the original signal to provide an output baseband signal which includes the information modulated into the original DSB-SC signal. For good performance, precise matching of gain setting components is required, as in most prior art demodulators.

A circuit which measures variations in the capacitance of a single measuring capacitor is disclosed in the Rudolf U.S. Pat. No. 4,483,194, which describes an acceleration measuring circuit. The measuring circuit is associated with a variable capacitance formed by a flap, or vane, and an electrode. The variable capacitance is part of a measuring-bridge circuit which also includes a fixed capacitance and two resistors. A high-frequency signal is injected into the measuring-bridge circuit at the junction of the two capacitances. The junction point of the two resistors is connected to ground. The junction of the variable capacitance and a first one of the resistors is coupled to an input terminal of a first rectifier circuit. The junction of the fixed capacitance and the second resistor is coupled to an input terminal of a second rectifier circuit. The output terminal of the first rectifier circuit is connected to the non-inverting input terminal of a differential amplifier, while the output terminal of the second rectifier circuit is connected to the inverting input terminal of the differential amplifier. Movement of the flap under the effect of acceleration produces corresponding amplitude modulation of the signal at the junction of the variable capacitance and the first one of the resistors. The differential amplifier measures the difference in amplitude between the two rectified signals and provides an output signal which represents the acceleration of the flap. This patent also describes using the acceleration circuit in a feedback arrangement to hold the flap in a position close to its equilibrium position.

The Holdren et al. U.S. Pat. No. 4,165,483 describes a pair of differential capacitors. A reference current generator applies a square wave to each pickoff capacitor and the resulting voltage across each pickoff capacitor is then applied to a fixed capacitor. The resulting fixed capacitor currents each respectively provide a measure of the capacitance of the respective pick-off capacitors.

The Holdren et al. U.S. Pat. No. 4,206,400 describes a capacitive pickoff used in a servoed accelerometer, where a loop feedback circuit generates a currents through a torque coil sufficient to move a measuring pendulum to a midpoint between the capacitor plates.

SUMMARY OF THE INVENTION

It is therefore an object of the invention to provide a differential capacitive pickoff detector system which has reduced DC offset errors.

It is another object of the invention to provide a differential capacitive pickoff detector system which is less sensitive to variations is dc offsets in such elements as diode detectors and in DC amplifiers, and which is less sensitive to mis-matching of gain setting components such as resistors and capacitors.

In accordance with these and other objects of the invention, an improved capacitance position pickoff detector is provided for use with differential pickoff capacitors. One terminal of each of a first and second capacitor are tied to a common low impedance point such as ground. A first current source provides a first alternating current signal to a voltage terminal of the first capacitor. This first current signal alternates between a first current level and a second current level at a predetermined carrier clock switch rate to produce a voltage signal at the terminal. This voltage is a double-sideband, large carrier DSB-LC voltage signal encoding the spacing of the capacitor plates. Means are provided for adjusting the average value of the first voltage signal at the terminal. A second current source having nominally the same characteristics as the first current source is provided to produce a second alternating current signal for the second capacitor. Means are provided for combining the first DSB-LC voltage signal with the second DSB-LC voltage signal to provide an amplitude-modulated, double-sideband, suppressed-carrier DSB-SC signal. Finally, means are provided for synchronously demodulating the DSB-SC signal using a quadrature reference carrier clock signal which is 90 degrees from the signal used to switch the first and second current signals at the predetermined reference clock switching rate. The means for synchronously demodulating the DSB-SC signal provides an output baseband signal which represents the difference between the spacing of the first and the second differential capacitor plates. According to one embodiment of the invention the first current source includes a current generator which provides a current I to the terminal of the first of the differential capacitors. A switch intermittently connects a second current generator to the terminal of the differential capacitor and provides a current nominally equal to2I. Similarly, another current generator provides a current nominally I to the terminal of the second differential capacitor and a second switch intermittently connects a current generator to provide a current nominally −2I to the output terminal of the second differential capacitor. The current generators providing the −2I currents are alternately switched between the terminals of the two capacitors to provide substantially the same drive current to each capacitor, without requiring perfect matching of the two nominally −2I current sources. The means for adjusting the average value of the first and the second terminal voltages of the respective differential capacitors include low pass filters which provide low-frequency control signals proportional to the average value of the voltage levels on the respective terminals of the differential capacitors. The low-frequency control signals are used to control the average value of the respective capacitor terminal voltages by controlling the magnitude of the two nominally I current sources, respectively, keeping the average current in each capacitor substantially equal to zero without requiring the magnitude of the current sources or the duty cycle to be perfect.

The DSB-LC voltage signals are combined using a difference circuit. The difference circuit includes a single gain setting element which sets a substantially identical gain for both the positive and negative input signals without requiring matching of components. The gain setting element converts the respective DSB-LC voltage signals to a single DSB-SC current signal. The difference circuit includes two transistors which have their respective bases coupled to the respective terminal voltages of the differential capacitors. The bases of each of the transistors have a resistor coupled therebetween so that the signal current through the resistor is proportional to the difference between the respective voltages. The currents through the transistors are combined using current mirrors which buck signals to produce a difference DSB-SC current signal.

The synchronous demodulator includes a single gain setting impedance, for example, a capacitor. A switch arrangement, which is operated synchronously in quadrature with the reference carrier clock signal, provides two modes of connection of the input current to the load impedance. In the first mode the input current is connected to one end of the load impedance and the other end of the load impedance is connected to a low impedance such as ground. In the second mode of operation the input current is connected to the other end of the load impedance with the opposite terminal of the load impedance connected to a low impedance. This arrangement, with the switches being switched synchronously with the reference carrier, synchronously demodulates the input current DSB-SC signal, the voltage across the gain setting impedance providing a baseband voltage signal. Using a capacitor as the gain setting impedance provides for integrating the demodulated signal. If the reference carrier clock has a 50% duty cycle, this form of integrating synchronous demodulator is very insensitive to DC offset errors compared to prior art demodulators as DC input currents are virtually averaged to zero over each full cycle, and as the integration from a current to a voltage on the capacitor occurs ahead of any subsequent amplifier voltage offset errors, and as the bias current errors of any subsequent amplifiers and leakage currents of the switches are rejected to the extent that they match on the two terminals of the capacitor.

Means are provided for obtaining smooth transitions of the voltage signals on the load capacitor when the switches are switched to the first and the second positions. This includes providing a low impedance half difference signal equal to one-half of the differential voltage across the gain setting capacity to one of the terminals of the capacitor when the switches are in one position and providing an inverted half-difference signal to the other terminal of the capacitor when the switches are in the second position.

Current control means are provided for maintaining the peak-to-peak level of the DSB-LC voltage signals at a predetermined average value.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
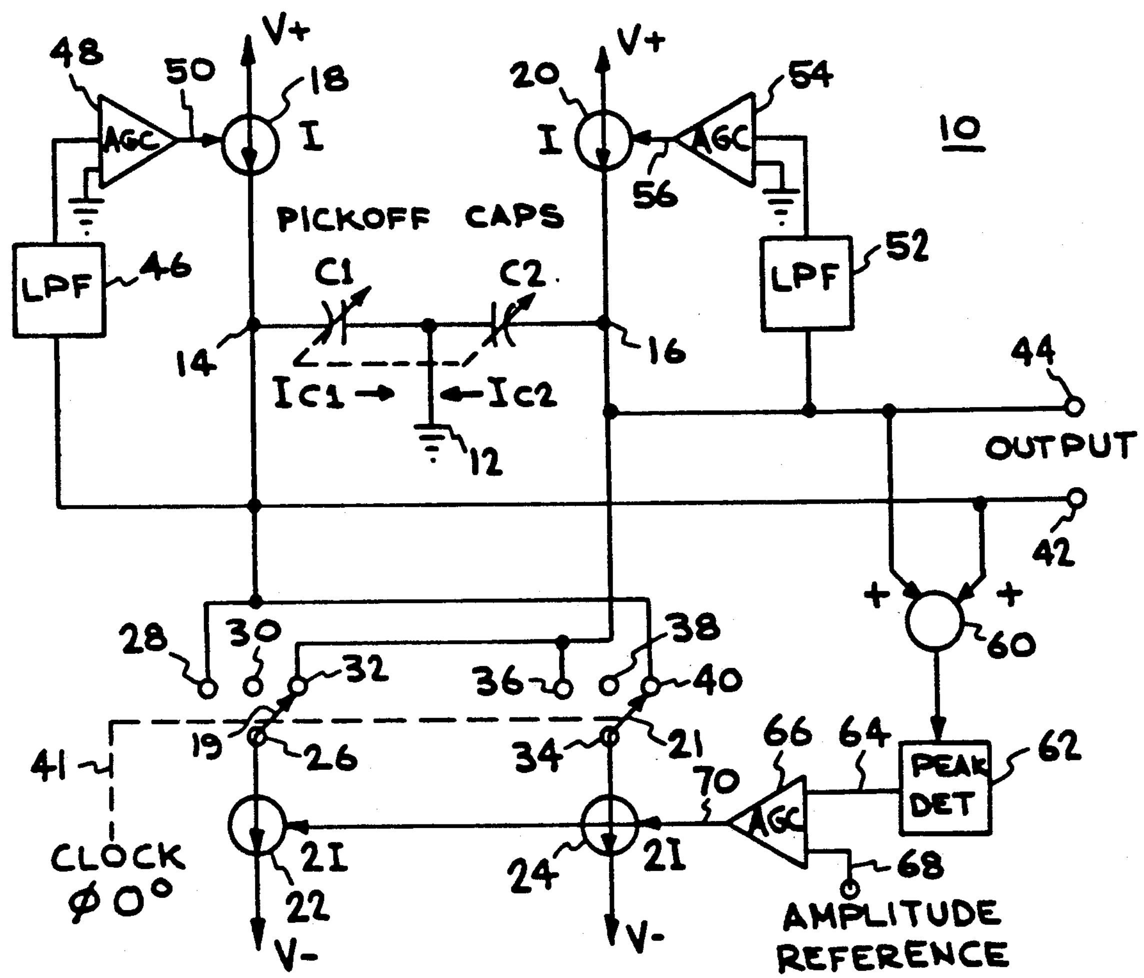
FIG. 1 is a schematic block diagram of a capacitive pickoff modulator, which provides two in-phase double sideband large-carrier, output voltage signals, each encoding the position of one of a pair of differential pickoff capacitor plates.

FIG. 1 shows a capacitive pickoff modulator circuit 10. Differential pickoff capacitors C1, C2 are provided. The capacitors are formed such that the interior plates of the capacitors are formed from the housing structure of, for example, an accelerometer. These plates are tied together and connected to a ground reference potential 12. The movable plate of the first capacitor C1 is connected to a terminal 14. Similarly the movable plate of the second capacitor C2 is connected to a terminal 16. The movable plates connected to the respective terminals 14, 16 are formed, for example, as conductive plated areas on a panel of a pendulum. The capacitors C1, C2 operate differentially such that when the pendulum moves, one of the capacitors has the spacing between its plates increase while the spacing between the plates of the other capacitor decreases. A first current source 18 continuously provides a nominal current I to the terminal 14. A second current source 20 also provides a nominal current I to the other capacitor terminal 16.

Additional chopped currents are provided to the respective terminals 14,16 by means of switches 19,21 from current sources 22,24 which each provide nominal 50% duty cycle negative currents 2I to the terminals 14, 16. The current source 22 is connected to the common terminal 26 of the switch 19. The switch 19 is a three position switch with three output terminals 28,30,32. Terminal 28 is connected to the first differential capacitor output terminal 14 as shown. Terminal 30 has no connection. Terminal 32 is connected to the opposite differential capacitor output terminal 16. Switch 21 has a common terminal 34 connected to the current source 24. Switch 21 has three output terminals 36,38,40. Terminal 36 is connected to the output terminal 16 of the second differential capacitor C2. Terminal 38 has no connection. Terminal 40 is cross connected to the output terminal 14 of the opposite differential capacitor C1. Note that the switches 19,21 schematically represent linear switches such as, for example, provided by linear switching transistors or the equivalent. The dotted line 41 indicates that the switches 19,21 are set to various positions by a clock signal which corresponds to the reference carrier clock signal, which is a square wave signal operating at a frequency, for example, of 250 kHz. The switches 19,21 cycle through four positions in two cycles of the reference carrier clock signal. For example, during the first half cycle of the sequence, switch terminal 32 is connected to the negative current source 22. During the second half cycle, the switch 19 is connected to the terminal 30 so that current from the negative current source 22 does not flow through either capacitor C1 or C2. During the third half cycle, the switch 19 is connected to terminal 28 so that current from the negative source 22 flows out of the terminal 14 of the differential pickoff capacitor C1. During the fourth half cycle the switch 19 is again positioned to terminal 30 so that no current from the negative current source 22 flows. In operation, current from the negative current source 22 flows in alternate half cycles from the output terminal 14 of the differential capacitor C1 and the output terminal 16 of the differential capacitor C2. In a similar fashion current flows from the other negative current source 24 during alternate half cycles of the reference carrier clock signal to terminal 36 or to terminal 40. When the switches 19, 21 contact terminals 30, 38 net currents IC1, IC2 of magnitude I flow through capacitors C1, C2, respectively. During the other half cycles of the reference carrier clock signal, net currents IC1, IC2 of magnitude −I flow out of the capacitors C1, C2. The currents IC1, IC2 into and out of each of the capacitors C1, C2 are in-phase.

Figure 2:
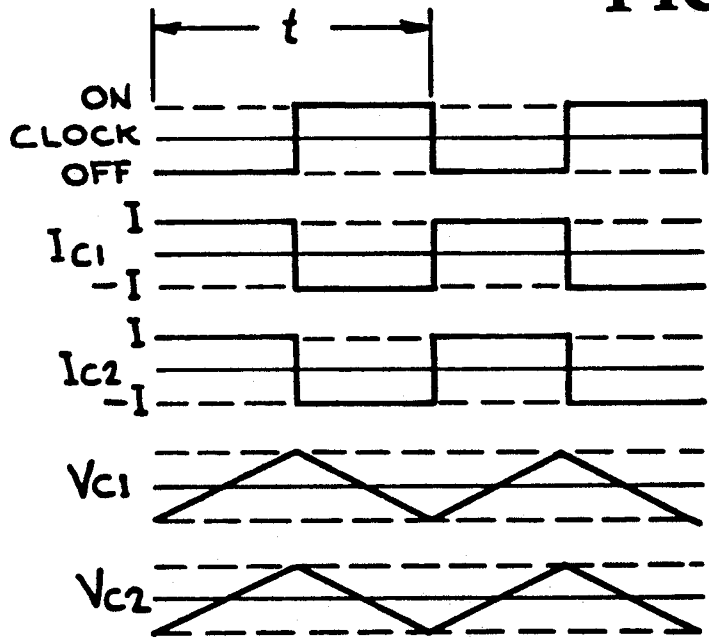
FIG. 2 shows signal waveforms for the modulator of FIG. 1.

FIG. 2 shows the reference carrier clock signal CLOCK. The resultant currents to and from the respective capacitor terminals 14, 16 through capacitors C1, C2 are shown in FIG. 2 as $I_{C1}$ and $I_{C2}$. Note that these currents alternate between a current level I, when the switches 19,21 are connected to respective terminals 30,38. The currents are at a net level −I when the switches 19,21 are in positions 28,32,36,40. The negative current levels −2I are alternately provided from the negative current sources 22,24 by the cross connections provided by the switches 19,21 as shown in FIG. 1.

The resulting voltage on the differential pickoff capacitors C1,C2 is the integral of the current over time with the capacitance as a proportionality constant. The voltage waveforms as shown in FIG. 2 $V_{C1}$, $V_{C2}$ are triangular waves with peak amplitudes of $It/_{4C}$ where t is the time of one complete clock cycle, and C is the capacitance of the respective differential capacitors C1,C2. For a parallel plate capacitor, its capacitance is approximately $C=eA/x$ where e is the permitivity of the dielectric medium for the capacitor, A is the plate area, and x is the spacing between the capacitor plates. Consequently, the voltage on each of the capacitors is a triangular wave of period t whose amplitude is directly proportional to the capacitor plate spacing, $V=Itx/4eA$.

The triangular waves $V_{C1}$, $V_{C2}$ as shown in FIG. 2 are carrier signals for two double-sideband, large carrier (DSB-LC) signals. It should be appreciated that as the capacitances of the differential capacitors C1, C2 vary, the amplitude of the DSB-LC signals at terminals 14, 16 will vary in opposite directions.

The output signals from the double-sideband, large carrier, DSB-LC are provided at respective output terminals 42, 44.

If a net voltage appears across the plates of the pickoff capacitors C1,C2, electrostatic forces may cause a net shift in position of the movable pendulum. For an accelerometer, the shift in the null position of the pendulum causes, in effect, a "acceleration" bias as well as a slight change in the input axis for the pendulum. It is very desirable that the net voltage across the capacitors be very close to zero volts. Note that the modulator as shown in FIG. 1 of the drawings, as well as a demodulator circuit to be subsequently described in this description of the preferred embodiments, are all DC coupled in a servo loop such that the DSB-LC signals generated in the modulator of FIG. 1 are subtracted and demodulated to provide a signal which is fed into a control coil for positioning the pendulum to which pickoff capacitors C1, C2 are attached. For closed loop operation, this system is ideally designed to position the pendulum at its mechanical null position, where no net mechanical torques act on it. Consequently, any mechanical offsets produced by DC offsets in the capacitive pickoff portion of the servo loop should be minimized.

If the average, or DC, level of the voltages across the pickoff capacitors C1,C2 are maintained at zero volts, linearity is improved and the induced electrostatic forces across the capacitors are also reduced. Means for adjusting the average value of the voltages across the pickoff capacitors C1,C2 are provided by automatic gain control circuits AGC for the variable current sources 18,20. For the current source 18, the AGC circuit includes a low pass filter 46 which has its input terminal connected to the output terminal 14 of the variable capacitor C1. The low pass filter output terminal is connected to the input terminal of an AGC amplifier 48. The output signal from the AGC amplifier 48 provides a control signal on a signal line 50 to control the amplitude of the current I from the current source 18. Similarly an AGC circuit for the other current source 20 is provided by the input to a low pass filter 52 being coupled to an output terminal 16 of the differential capacitor C2. The output signal from the low pass filter 52 is amplified by an AGC amplifier 54 to provide a control signal on a signal line 56 for the variable current source 20. The function of the respective AGC loops is to drive the value of the respective current sources 18,20 to current levels such that the average, or DC, level of the signals produced at respective output terminals 14,16 are very close to zero volts. The low pass filters 46,52 pass only low frequency information to control the current sources 18,20 for this purpose.

Variations in the current levels produced by the negative current sources 22,24 are cancelled by the cross coupling of these current sources to the terminals 14,16 as provided by switches 19,21. Any difference in the current levels of the current sources 22,24 is thus eliminated on a long term basis. An automatic current control ACC circuit is provided for the modulator of FIG. 1 to maintain the amplitude of the triangular signals $V_{C1}$ and $V_{C2}$ at respective terminals 14,16. The ACC circuit includes a summer circuit 60 for adding the output voltages at the respective pickoff terminals 14,16. The output signal from the summer 60 is fed to the input terminal of a peak detector circuit 62 which detects the peak amplitude of the sum signal that provides an output signal on a signal line 64 to an AGC amplifier 66. The other input signal to the AGC amplifier is an amplitude reference provided on a signal line 68. The output signal from the AGC amplifier 66 is provided on a signal line 70 to control terminals of the variable negative current sources 22,24. The control signals on signal line 70 vary the amplitude of the negative current sources 22,24 to maintain substantially constant peak-to-peak signal levels at the output terminals 42,44 of the modulator circuit shown in FIG. 1. Switching the current sources 22,24 between the two pickoff capacitors every other clock cycle ensures that the total alternating current drive for each of the pickoff capacitors are equal. Initial mechanical offset of the capacitors and induced electrostatic forces are reduced by balancing the two negative current sources.

Figure 3:
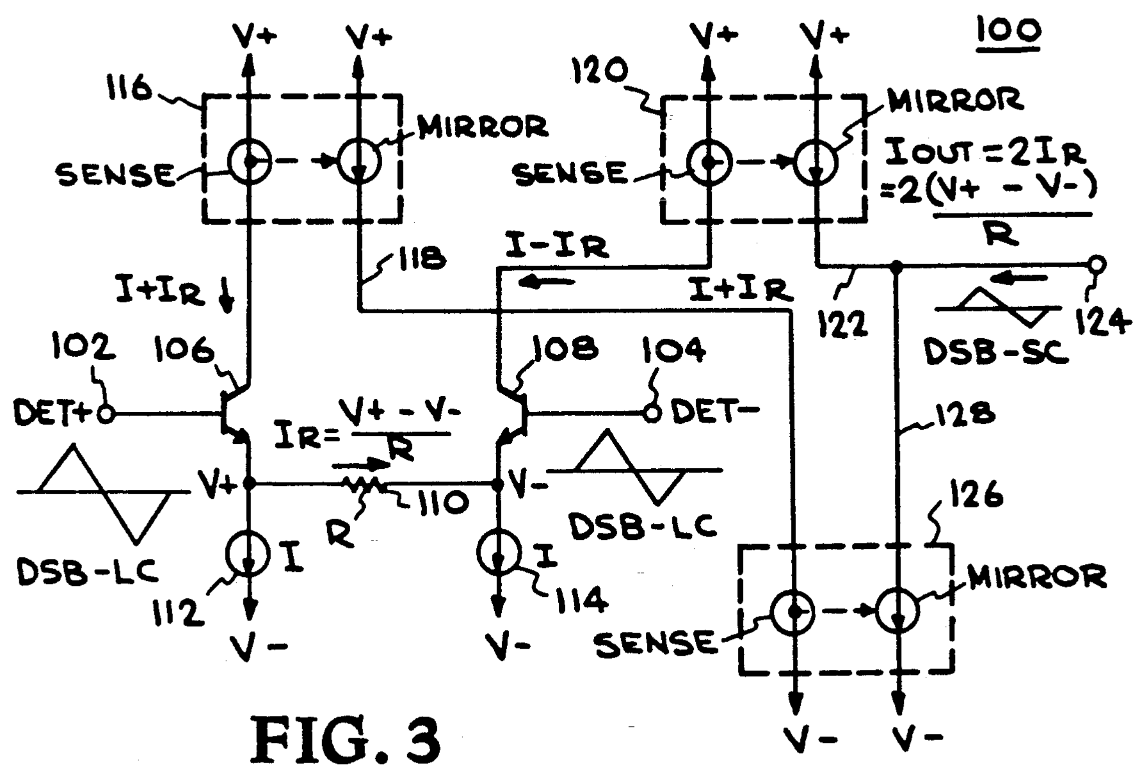
FIG. 3 is a schematic block diagram of a high-gain subtractor circuit, which is used to combine the DSB-LC voltage output signals of FIG. 1 to provide a difference DSB-SC current output signal.

FIG. 3 shows a subtraction circuit 100 for subtracting the signals provided at the output terminals 42,44 of the modulator circuit 10. The subtraction circuit 100 uses a single gain-setting element to eliminate matching requirements for this circuit. Prior art subtraction circuit designs used in capacitive position detectors required the use of two-gain setting elements which introduces a significant possibility of matching errors for the two elements initially, over temperature, or over life. Using a single element reduces initial offset errors and also improves linearity of the position detector system. The subtraction circuit receives one input of voltage signal from the modulator circuit 10 on a terminal 102, designated DET+. The other input terminal 104 of the subtractor 100 receives a voltage signal from the modulator 10 which is designated DET−. Input terminal 102 and input terminal 104 both have double sideband, large carrier DSB-LC signals coupled thereto. The function of the subtractor circuit 100 is to very accurately subtract these signals, thus suppressing the carrier completely. Errors in the subtraction process will result in significant errors in the output because subtraction errors in the large carrier components produce significant DC errors in the baseband signal. Therefore, it is important that the subtraction operation be precisely performed by the subtraction circuit 100. The voltage signal at terminal 102 and the voltage signal at terminal 104 are each respectively converted to currents through respective transistors 106 and 108. Terminal 102 is connected to the base of transistor 106 while terminal 104 is connected to the base of transistor 108. A conductance such as resistor 110 has one terminal connected to the emitter of transistor 106 and has its other terminal connected to the emitter terminal of transistor 108. The conductance can be real or complex. A current source 112 is connected between the emitter of transistor 106 and a reference potential V−. A second current source 114 is connected between the emitter terminal of the transistor 108 and the reference potential V−. The current $I_R$ through the resistor 110 is equal to the difference in the voltages at the emitters of the respective transistors 106,108 divided by the value of the resistance. Consequently the collector current of the first transistor 106 is equal to the sum of the current from the current source 112 and the current through the resistor 110. The collector current for the second transistor 108 is equal to the current from the second current source 114 minus the current through the resistor 110.

Since the current through resistor 110 is proportional to the difference between the emitter voltages of the two transistors 106,108, which are in turn proportional to the voltage on the input terminals 102,104, a means for subtracting the collector currents of transistors 106,108 is needed to provide an output signal proportional to the current through the resistor 110. The current through the resistor 110, as previously mentioned, is proportional to the difference in the terminal voltages at terminals 102,104. The collector current through transistors 106,108 are subtracted using current mirrors. The collector current of the transistor 106 is the reference input current for a first current mirror circuit 116, which has an output current on a signal line 118 which is equal to the collector current through transistor 106. A second current mirror 120 provides an output current on signal line 122 which is terminated in an output terminal 124 for the subtraction circuit 100. The current on signal line 122 is equal to the collector current of the transistor 108. A third current mirror circuit 126 translates the current on signal line 118 to a signal line 128. Both signal line 122 and signal line 128 feed the output terminal 124. This results in an output current IOUT equal to two times the current $I_R$ through the single-element summing resistor R110. The current signal at the output terminal 124 is proportional to the difference in the voltage signals at terminals 102, 104. It should be noted that since the difference signal is developed as a current in the resistor, ahead of the current mirrors, that precise gain setting of the current mirrors is not critical to removal of the large carrier present on each input. The subtraction circuit 100 provides for subtraction of the carrier signal of both of the input signals such that a double sideband, suppressed carrier DSB-SC signal is provided.

Figure 4:
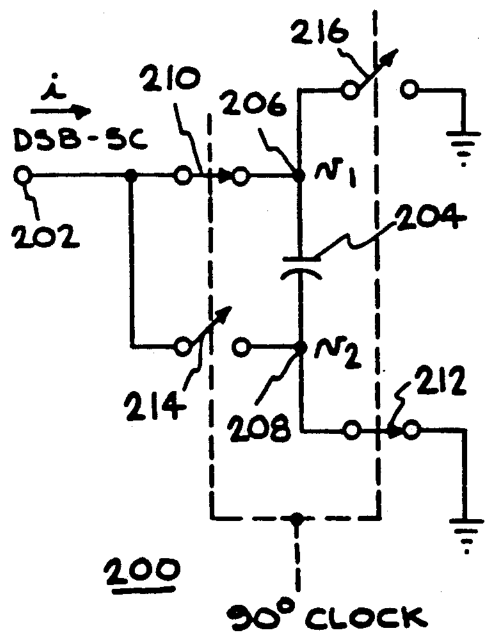
FIG. 4 is a simplified schematic diagram of an integrating synchronous demodulator for demodulating the DSB-SC current difference output signal provided from the subtractor circuit of FIG. 3, providing a baseband voltage signal.

FIG. 4 shows a simplified schematic diagram of an integrating synchronous demodulator 200 for demodulating the DSB-SC signal on terminal 124 of the subtraction circuit 100 of FIG. 3. The DSB-SC signal is coupled to an input terminal 202 of the demodulator circuit 200. The input current at terminal 202 is shown as i in FIG. 5. The demodulator 200 includes a load impedance, for example, a capacitor 204 connected between a terminal 206 and a terminal 208. The voltage at terminal 206 is designated as $v_1$ while the voltage at the terminal 208 is designated as $v_2$. A first switch 210 connects the input terminal 202 to the $v_1$ terminal 206. A second switch 212 connects the $v_2$ terminal 208 to a reference ground potential, as shown. Switches 210, 212 are ganged together to be in an open position or in a closed position together. A third switch 214 connects the input terminal 202 to the $v_2$ terminal 208, while a fourth switch 216 connects the $v_1$ terminal 206 to the reference ground potential. Switches 214, 216 are also locked together so that they both are in an open position or in a closed position together. The pair of switches 210, 212 and the pair of switches 214, 216 are controlled by a 90 degree clock which is in quadrature with the system clock signal as shown in FIG. 2 of the drawings, so that one pair is in an open position while the other pair is in a closed position, and vice-versa. This switching of the switches from open to closed positions and synchronized with the clock signal demodulates the DSB-SC signal.

Figure 5:
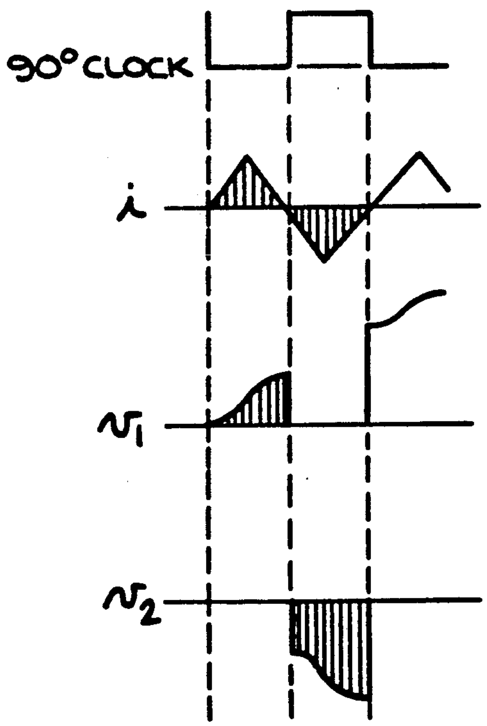
FIG. 5 shows signal waveforms for the synchronous demodulator of FIG. 4.

FIG. 5 shows signal waveforms for $v_1$ at terminal 206 and for $v_2$ at terminal 208. For the first half of the clock cycle terminal $v_1$ is connected to the input terminal 202 and terminal $v_2$ is connected to ground such that the triangle-shaped input current during this time period flows through capacitor 204 from terminal 206 to terminal 208 and is integrated by capacitor 204 to provide the voltage signal $v_1$ as shown. For the second half of the clock signal, signal $v_1$ is connected to ground and has a zero voltage level, as indicated in FIG. 5. In a similar manner the voltage $v_2$ at terminal 208 is at a ground or zero signal level for the first half of the clock signal. During the second half of the clock signal the voltage $v_2$ initially jumps to a voltage equal and opposite to the voltage $v_1$ on terminal 206 when terminal 206 is connected to ground because the voltage across the capacitor 204 cannot instantaneously change in value. The input current flows through capacitor 204 in the opposite direction in the second half cycle for the same polarity input current. However, the actual input current changes sign at the clock transitions, so that the voltage across the capacitor (V1–V2) continues to integrate in the same direction in actual operation. Note that the switches 210, 212, 214, 216 are implemented, for example, by linear transistor gate circuits.

Figures 6, 7:
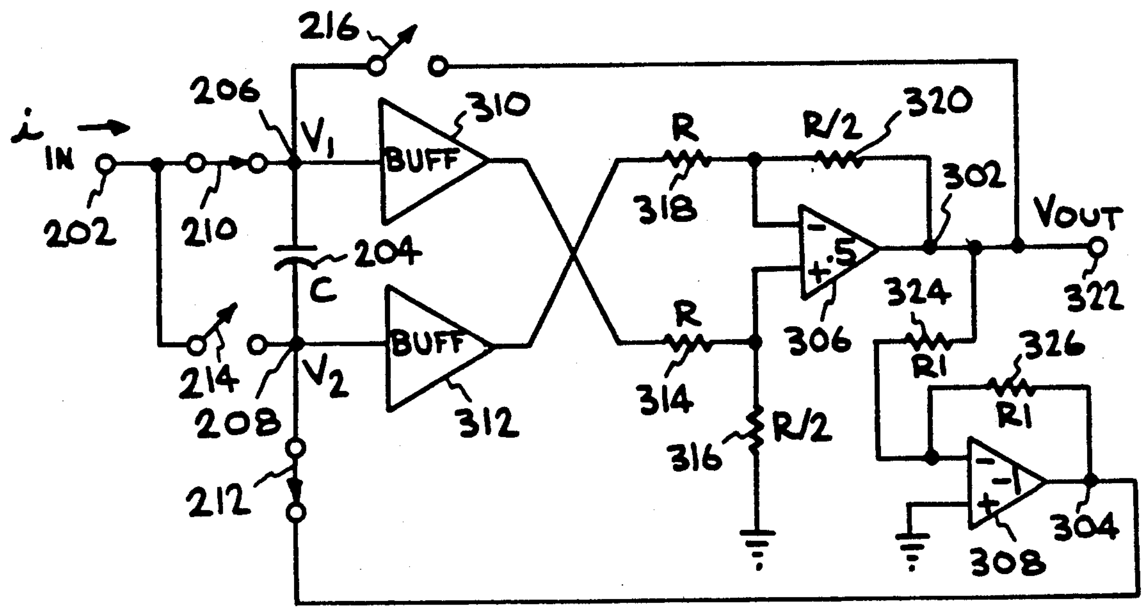
FIG. 6 is a schematic diagram of a synchronous demodulator circuit which uses feedback to provide continuous signals, across its integrating capacitor.
FIG. 7 shows signal waveforms for the synchronous demodulator of FIG. 6.

FIG. 6 shows essentially the demodulator of FIG. 4 with the addition of the use of feedback to provide continuous signals on the integrating capacitor 204. The same reference numerals are used in both FIGS. 4 and 6 for the same components.

FIG. 7 shows waveforms for the synchronous clock signal, the current in, and the voltages $v_1$ and $v_2$. The switches 212 and 216, instead of connecting to a ground reference potential, connect the terminals for voltages $v_1$ and $v_2$ to low impedance output terminals 302, 304 of respective operational amplifiers 306, 308. The gains and DC output levels of the operational amplifier 306,308 are set such that the voltages $v_1$ and $v_2$ make smooth transitions when the various switches are opened and closed by the reference carrier clock signal. Terminal 206 is connected to the input terminal of a buffer amplifier 310 and terminal 208 is connected to the input terminal of a second buffer amplifier 312. The output terminal of the buffer amplifier 310 is connected to a resistor R314 to the non-inverting input terminal of amplifier 306, with the non-inverting input terminal of operational amplifier 306 connected to ground through a resistor R/2 316. The output terminal of the buffer amplifier 312 is connected through another resistor R318 to the inverting input terminal of the operational amplifier 306. The operational amplifier 306 has a resistor R/2 320 connected between the output terminal 302 and the inverting input terminal of the operational amplifier 306. The operational amplifier provides the output signal which is equal to one-half of the difference between the voltages $v_1$ and $v_2$ at an output terminal 322. Feedback is provided from the output terminal 302 of the operational amplifier 306 to the switch 216. The operational amplifier 308 is connected as an inverting amplifier with unity gain as provided by the input resistor R1 324 and the feedback resistor R1 326. The output terminal 304 of the operational amplifier 308 is connected to the switch 212. The output impedances of the amplifiers 302, 304 are low impedance and the signals provided to the switches, as shown in FIG. 6 for voltage $v_1$ and $v_2$, prevent sudden change in the voltage levels of signals $v_1$ and $v_2$. FIG. 7 also shows the output voltage Vout equal to one-half of the difference between $v_2$ and $v_1$.

Figure 8:
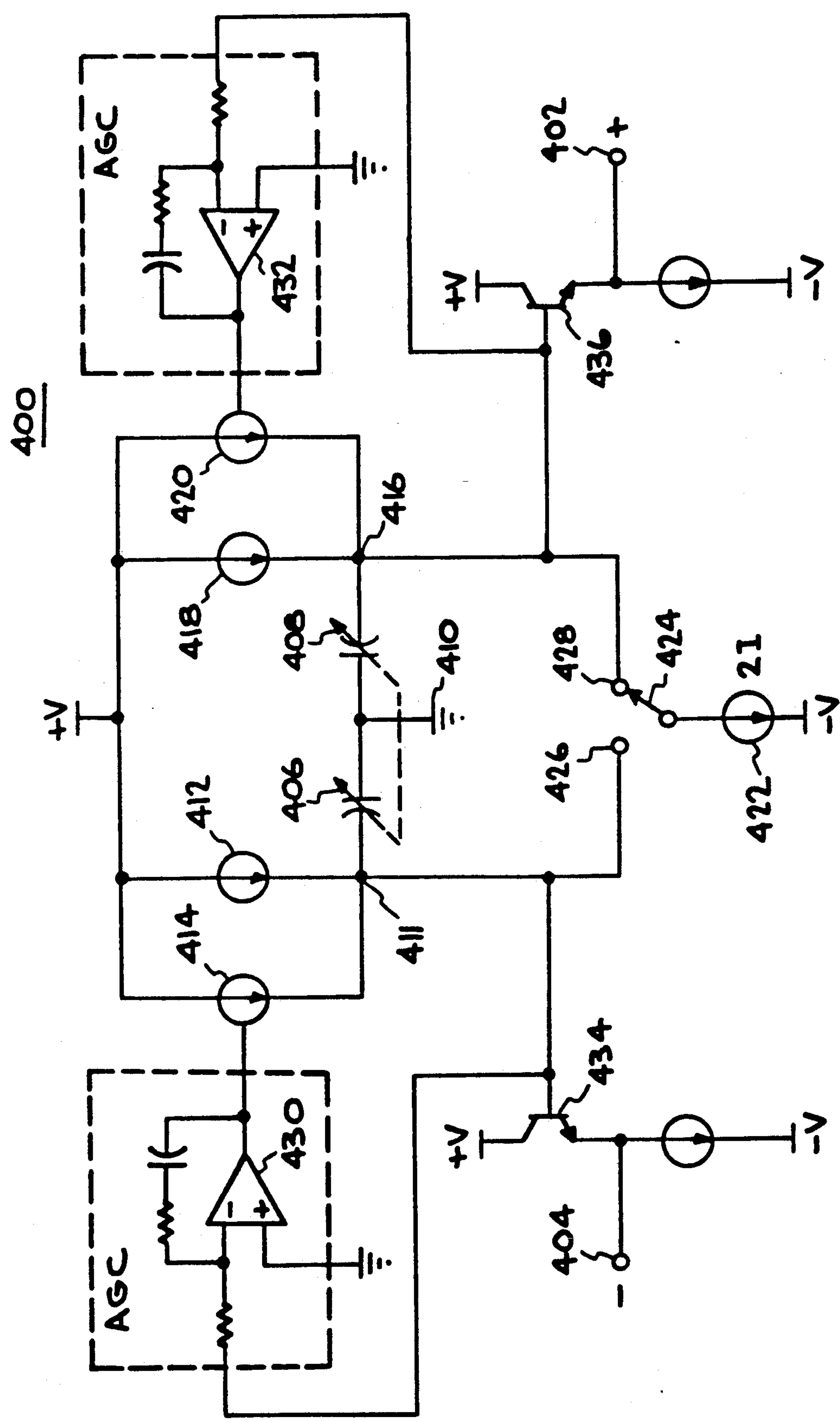
FIG. 8 is an alternative embodiment of a capacitive pickoff modulator, which provides out-of-phase output signals.

FIG. 8 shows an alternative embodiment of a capacitive pickoff modulator 400, which provides out-of-phase output signals at an output terminal 402 and an output terminal 404. This is in contrast to the modulator of FIG. 1 which provides in-phase output signals. A pair of differential capacitors 406 and 408 have common terminals connected to a ground reference potential 410. A signal terminal 411 of the first differential capacitor 406 has connected thereto a first current source 412 and a second variable current source 414. Similarly, the output terminal 416 of the second differential capacitor 408 has a third current source 418 and a variable current source 420 connected thereto. The combination of these pairs of current sources 412, 414 and 418, 420 each provide currents I to the respective terminals 411, 416. A negative current source 2I 422 provides a negative current through a switch 424 to the terminals 411, 416. The switch 424 is switched between a first terminal 426 connected to the terminal 411 and a second output terminal 428 connected to the other terminal 416. The switch 424 is switched in synchronism with a reference carrier clock signal, as described previously. The DC voltage levels of the terminals 411, 416 are set to a zero level by use of DC AGC amplifiers 430, 432. The output signals of the respective terminals 411, 416 are fed through emitter follower buffer 434, 436 to respective output terminals 404,402. For use of this embodiment modulator in the capacitive position detector system, the subtractor circuit described earlier would be replaced by an adder circuit.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A differential capacitive pickoff detector circuit for measuring the difference in capacitance between a first differential capacitor and a second differential capacitor, said first differential capacitor having a first terminal connected to a first reference potential and having a second terminal, said second differential capacitor having a first terminal connected to said first reference potential and having a second terminal, comprising:

first current source means, coupled to said second terminal of said first differential capacitor, for providing a first alternating current signal to said first capacitor, said first current signal alternating between a first current level and a second current level at a predetermined switching rate, said first alternating current signal producing a first voltage signal at said second terminal of said first differential capacitor, said first capacitor adapted to being varied to provide a first double-sideband, large-carrier, amplitude-modulated DSB-LC voltage signal at said second terminal;

first means for adjusting the average value of said first voltage signal at said second terminal of said first differential capacitor to a predetermined level;

second current source means, coupled to said second terminal of said second differential capacitor, for providing a second alternating current signal to said second capacitor, said second current signal alternating between a first current level and a second current level at the predetermined switching rate in synchronism with said first alternating current signal, said second alternating current signal producing a second voltage signal at said second terminal of said second differential capacitor, said second capacitor adapted to being varied to provide a second double-sideband, large carrier, amplitude-modulated DSB-LC voltage signal at said second terminal of said second differential capacitor;

second means for adjusting the average value of said second voltage signal at said second terminal to a predetermined level;

combining means for synchronously combining said first DSB-LC voltage signal with said second DSB-LC voltage signal to provide an amplitude-modulated double-sideband, suppressed-carrier DSB-SC signal;

means for synchronously demodulating said DSB-SC signal using a reference carrier clock signal to provide an output difference signal which represents the difference between the capacitance values of said first and said second differential capacitors.

2. The circuit of claim 1 wherein said first current source means comprises:

a first current generator providing a current I to said second terminal of said first differential capacitor;

first switch means for intermittently connecting a second current generator to said second terminal of said first differential capacitor to provide a current −2I to said second terminal of said first differential capacitor;

a third current generator providing a current I to the second terminal of said second differential capacitor;

second switch means for intermittently connecting a fourth current generator to said second terminal of said second differential capacitor to provide a current −2I to said second terminal of said second differential capacitor.

3. The circuit of claim 2 wherein said first switch means includes means for alternately intermittently connecting said second current generator and said fourth current generator to said second terminal of said first differential capacitor, and wherein said second switch means includes means for alternately intermittently connecting said fourth current generator and said second current generator to said second terminal of said second differential capacitor.

4. The circuit of claim 1 wherein said first means for adjusting the average value of said first voltage signal includes:

(a) a first lowpass filter, which has an input terminal connected to said second terminal of said first differential capacitor and which has an output terminal for providing a first low-frequency control signal proportional to the average value of the voltage level of said second terminal of said first differential capacitor;

(b) means for controlling said first alternating current signal with said first low-frequency control signal; and wherein said second means for adjusting the average value of said second voltage signal includes:

(a) a second lowpass filter, which has an input terminal connected to said second terminal of said second differential capacitor and which has an output terminal for providing a second low-frequency control signal proportional to the average value of the voltage level of said second terminal of said second differential capacitor;

(b) means for controlling said second alternating current signal with said second low-frequency control signal.

5. The circuit of claim 1 wherein said combining means includes a difference circuit for taking the difference between the first DSB-LC voltage signal and the second DSB-LC voltage signal.

6. The circuit of claim 5 wherein the difference circuit includes:

first means for converting said first DSB-LC voltage signal to a corresponding current signal;

second means for converting said second DSB-LC voltage signal to a corresponding current signal; and difference means for combining said corresponding current signals to provide a difference signal current.

7. The circuit of claim 6 wherein said first and said second means for converting includes a common impedance element.

8. The circuit of claim 7 wherein said difference circuit includes a first transistor having base, emitter, and collector terminals, said base terminal being coupled to said second terminal of said first differential capacitor, said emitter terminal being coupled to a first difference-circuit current source;

a second transistor having base, emitter, and collector terminals, said base terminal being coupled to said second terminal of said second differential capacitor, said emitter terminal being coupled to a second difference-current source; and wherein said common impedance element includes a resistor having a first terminal coupled to the emitter terminal of said first transistor and having a second terminal coupled to the emitter terminal of said second transistor, wherein the signal current through said resistor is proportional to the difference between said first DSB-LC voltage signal and said second DSB-LC voltage signal.

9. The circuit of claim 8 wherein said collector terminal of said first transistor is coupled to a reference input terminal of a first current-mirror circuit and wherein said collector terminal of said second transistor is coupled to a reference input terminal of a second current-mirror circuit;

including a third current-mirror circuit having a reference input terminal to which is coupled the output current of the first current-mirror circuit, wherein the output terminal of said third current-mirror is coupled to the output terminal of said second current-mirror circuit so that the output current of the second current-mirror circuit and the output current of the third current-mirror circuit buck to provide an output current proportional to the difference between the first DSB-LC voltage signal and the second DSB-LC voltage signal.

10. The circuit of claim 1 wherein the means for synchronously demodulating includes:

an input terminal for receiving a current DSB-SC signal;

a load impedance having a first terminal and a second terminal;

first switch means for coupling said input terminal to said first terminal of the load impedance;

second switch means for coupling said second terminal of said load impedance to a reference voltage, wherein said first and said second switch means are controlled by one phase of the reference carrier clock signal to be simultaneously open and by the other phase of the reference carrier clock signal to be simultaneously closed;

third switch means for coupling said input terminal to said second terminal of the load impedance;

fourth switch means for coupling said first terminal of said load impedance to a reference voltage, wherein said third and said fourth switch means are controlled by the other phase of the reference carrier clock signal to be simultaneously open and by the one phase of the reference carrier clock to be simultaneously closed;

whereby the DSB-SC signal is synchronously demodulated to provide a demodulated signal across said load impedance.

11. The circuit of claim 10 wherein said load impedance includes an integrating capacitance for integrating said demodulated signal.

12. The circuit of claim 10 including difference means for providing a difference signal proportional to the difference between the voltages on said first and said second terminals of said load impedance;

means for providing a half-difference signal equal to one-half of the difference signal to said first terminal of the load impedance capacitor through said fourth switch means;

means for providing an inverted half-difference signal to said second terminal of the load impedance capacitor through said second switch means;

whereby the difference signal is provided with smooth signal transitions when said first and second switch means and said third and said fourth switch means are opened and closed by the reference carrier clock signal.

13. The circuit of claim 1 including means for maintaining the peak-to-peak level of said DSB-LC voltage signals at a predetermined average value.

14. A modulator for encoding the capacitance of a variable capacitor, said capacitor having a first terminal connected to a first reference potential and having a second terminal, comprising:

first current source means, coupled to said second terminal of said capacitor, for providing an alternating current signal to said capacitor, said current signal alternating between a first current level and a second current level at a predetermined switching rate, said alternating current signal producing a voltage signal at said second terminal of said capacitor, said capacitor adapted to being varied to provide a double-sideband, large-carrier amplitude-modulated DSB-LC voltage signal at said second terminal;

first current source means comprising a current generator providing a current I to said second terminal of said capacitor; and switch means for intermittently connecting a second current generator to said second terminal of said capacitor to provide a current $-2I$ to said second terminal of said capacitor.

15. The modulator of claim 14 including means for adjusting the average value of said voltage signal at said second terminal to a predetermined level.

16. The modulator of claim 15 wherein said means for adjusting the average value of said voltage signal includes:

a lowpass filter, which has an input terminal connected to said second terminal of said capacitor and which has an output terminal for providing a low-frequency control signal proportional to the average value of the voltage level of said second terminal of said capacitor; and means for controlling said alternating current signal with said first low-frequency control signal.

17. A differential capacitive pickoff modulator circuit for encoding the difference in capacitance between a first differential capacitor and a second differential capacitor, said first differential capacitor having a first terminal connected to a first reference potential and having a second terminal, said second differential capacitor having a first terminal connected to said first reference potential and having a second terminal, comprising:

first current source means, coupled to said second terminal of said first differential capacitor, for providing a first alternating current signal to said first capacitor, said first current signal alternating between a first current level and a second current level at a predetermined switching rate, said first alternating current signal producing a first voltage signal at said second terminal of said first differential capacitor, said first capacitor adapted to being varied to provide a first double-sideband, large-carrier amplitude-modulated DSB-LC voltage signal at said second terminal;

second current source means, coupled to said second terminal of said second differential capacitor, for providing a second alternating current signal to said second capacitor, said second current signal alternating between a first current level and a second current level at the predetermined switching rate in synchronism with said first alternating current signal, said second alternating current signal producing a second voltage signal at said second terminal of said second differential capacitor, said second capacitor adapted to being varied to provide a second double-sideband, large-carrier amplitude-modulated DSB-LC voltage signal at said second terminal.

18. The circuit of claim 17 including:

first means for adjusting the average value of said first voltage signal at said second terminal to a predetermined level; and second means for adjusting the average value of said second voltage signal at said second terminal to a predetermined level.

19. The circuit of claim 17 wherein said first current source means comprises:

a first current generator providing a current I to said second terminal of said first differential capacitor;

first switch means for intermittently connecting a second current generator to said second terminal of said first differential capacitor to provide a current −2I to said second terminal of said first differential capacitor;

a third current generator providing a current I to the second terminal of said second differential capacitor;

second switch means for intermittently connecting a fourth current generator to said second terminal of said second differential capacitor to provide a current −2I to said second terminal of said second differential capacitor.

20. The circuit of claim 19 wherein said first switch means includes means for alternately intermittently connecting said second current generator and said fourth current generator to said second terminal of said first differential capacitor, and wherein said second switch means includes means for alternately intermittently connecting said fourth current generator and said second current generator to said second terminal of said second differential capacitor.

21. The circuit of claim 18 wherein said first means for adjusting the average value of said first voltage signal includes:

a first lowpass filter, which has an input terminal connected to said second terminal of said first differential capacitor and which has an output terminal for providing a first low-frequency control signal proportional to the average value of the voltage level of said second terminal of said first differential capacitor;

means for controlling said first alternating current signal with said first low-frequency control signal; and wherein said second means for adjusting the average value of said second voltage signal includes:

a second lowpass filter, which has an input terminal connected to said second terminal of said second differential capacitor and which has an output terminal for providing a second low-frequency control signal proportional to the average value of the voltage level of said second terminal of said second differential capacitor;

means for controlling said second alternating current signal with said second low-frequency control signal.

22. The circuit of claim 17 including combining means for synchronously combining said first DSB-LC voltage signal with said second DSB-LC voltage signal to provide an amplitude-modulated double-sideband, suppressed-carrier DSB-SC signal.

23. The circuit of claim 22 wherein said combining means includes a difference circuit for taking the difference between the first DSB-LC voltage signal and the second DSB-LC voltage signal.

24. The circuit of claim 23 wherein the difference circuit includes:

means for converting said first DSB-LC voltage signal and said second DSB-LC voltage signal to respective current signals; and difference means for combining said respective current signals to provide a difference signal current.

25. The circuit of claim 23 wherein said means for converting includes a common impedance element.

26. The circuit of claim 25 wherein said differential circuit includes a first transistor having base, emitter, and collector terminals, said base terminal being coupled to said second terminal of said first differential capacitor, said emitter terminal being coupled to a first difference-circuit current source;

a second transistor having base, emitter, and collector terminals, said base terminal being coupled to said second terminal of said second differential capacitor, said emitter terminal being coupled to a second difference-current source; and a resistor having a first terminal coupled to the emitter terminal of said first transistor and having a second terminal coupled to the emitter terminal of said second transistor, wherein the signal current through said resistor is proportional to the difference between said first DSB-LC voltage signal and said second DSB-LC voltage signal.

27. The circuit of claim 26 wherein said collector terminal of said first transistor is coupled to a reference input terminal of a first current-mirror circuit and wherein said collector terminal of said second transistor is coupled to a reference input terminal of a second current-mirror circuit; and including a third current-mirror circuit having a reference input terminal to which is coupled the output current of the first current-mirror circuit, wherein the output terminal of said third current-mirror is coupled to the output terminal of said second current-mirror circuit so that the output current of the second current-mirror circuit and the output current of the third current-mirror circuit buck to provide an output current proportional to the difference between the first DSB-LC voltage signal and the second DSB-LC voltage signal.

28. The circuit of claim 17 including means for maintaining the peak-to-peak level of said DSB-LC voltage signals at a predetermined average value.

29. A circuit for synchronously demodulating a double-sideband, suppressed-carrier DSB-SC signal comprising:

an input terminal for receiving a current DSB-SC signal;

a load impedance having a first terminal and a second terminal;

first switch means for coupling said input terminal to said first terminal of the load impedance;

second switch means for coupling said second terminal of said load impedance to a reference voltage, wherein said first and said second switch means are controlled by one phase of the reference carrier clock signal to be simultaneously open and by the other phase of the reference carrier clock signal to be simultaneously closed;

third switch means for coupling said input terminal to said second terminal of the load impedance;

fourth switch means for coupling said first terminal of said load impedance to a reference voltage, wherein said third and said fourth switch means are controlled by the other phase of the reference carrier clock signal to be simultaneously open and by the one phase of the reference carrier clock to be simultaneously closed; and whereby the DSB-SC signal is synchronously demodulated to provide a demodulated signal across said load impedance.

30. The circuit of claim 29 wherein said load impedance includes an integrating capacitance for integrating said demodulated signal.

31. The circuit of claim 29 including difference means for providing a difference signal proportional to the difference between the voltages on said first and said second terminals of said load impedance;

means for providing a half-difference signal equal to one-half of the difference signal to said first terminal of the load impedance capacitor through said fourth switch means;

means for providing an inverted half-difference signal to said second terminal of the load impedance capacitor through said second switch means; and whereby the difference signal is provided with smooth signal transitions when said first and second switch means and said third and said fourth switch means are opened and closed by the reference carrier clock signal.

32. In a circuit for monitoring a difference in capacitance between first and second differential capacitors: means for producing a double sideband, large carrier, amplitude modulated signal on each of the capacitors, means for synchronously combining the double sideband, large carrier signals to provide a double sideband, suppressed carrier signal, and means for synchronously demodulating the double sideband suppressed carrier signal.

33. The circuit of claim 32 wherein the means for producing a double sideband, large carrier, amplitude modulated signal on each of the capacitors includes means for alternately applying currents having levels of I and −2I to the capacitors.

34. The circuit of claim 32 including means for adjusting the signal on each of the capacitors to a predetermined average voltage level.

35. The circuit of claim 34 wherein the means for adjusting the signal on each of the capacitors comprises a lowpass filter coupled to the capacitor for providing a low frequency control signal corresponding to the average voltage level of the signal on the capacitor, and means responsive to the control signal for controlling the current applied to the capacitor.

36. The circuit of claim 32 including means for maintaining the signal on each of the capacitors at a predetermined peak-to-peak voltage.

37. The circuit of claim 36 wherein the means for maintaining the signal on each of the capacitors at a predetermined peak-to-peak voltage includes means for providing a summation signal corresponding to the sum of the signals on the capacitors, means for monitoring the summation signal and providing a peak signal corresponding to the peak amplitude of the summation signal, and means responsive to the peak signal for adjusting the current applied to the capacitors.

38. The circuit of claim 32 wherein the means for synchronously combining the signals on the capacitors includes a load impedance, means responsive to a reference clock signal for applying the signal from the first capacitor to the load impedance during a first phase of the reference clock signal, and means responsive to the reference clock signal for applying the signal from the second capacitor to the load impedance during a second phase of the reference clock signal.

* * * * *